(12) United States Patent
Kuo et al.

(10) Patent No.: US 10,283,799 B2
(45) Date of Patent: May 7, 2019

(54) MEMBRANE ELECTRODE ASSEMBLY STRUCTURE OF FUEL CELL AND THE METHOD OF FABRICATING THE SAME

(71) Applicants: Hong-Yi Kuo, Taoyuan (TW); Tai-Nan Lin, Taoyuan (TW); Jen-Yuan Kuo, Taoyuan (TW); Ming-Wei Liao, Taoyuan (TW); Chun-Yen Yeh, Taoyuan (TW); Yu-Ming Chen, Taoyuan (TW); Wei-Xin Kao, Taoyuan (TW)

(72) Inventors: Hong-Yi Kuo, Taoyuan (TW); Tai-Nan Lin, Taoyuan (TW); Jen-Yuan Kuo, Taoyuan (TW); Ming-Wei Liao, Taoyuan (TW); Chun-Yen Yeh, Taoyuan (TW); Yu-Ming Chen, Taoyuan (TW); Wei-Xin Kao, Taoyuan (TW)

(73) Assignee: INSTITUTE OF NUCLEAR ENERGY RESEARCH ATOMIC ENERGY COUNCIL EXECUTIVE YUAN, Taoyuan (TW)

( * ) Notice: Subject to any disclaimer, the term of this patent is extended or adjusted under 35 U.S.C. 154(b) by 0 days.

(21) Appl. No.: 15/496,003

(22) Filed: Apr. 25, 2017

(65) Prior Publication Data
US 2018/0309147 A1 Oct. 25, 2018

(51) Int. Cl.
*H01M 8/00* (2016.01)
*H01M 8/1004* (2016.01)
*H01M 8/1213* (2016.01)
*H01M 8/124* (2016.01)

(52) U.S. Cl.
CPC ....... *H01M 8/1004* (2013.01); *H01M 8/1213* (2013.01); *H01M 2008/1293* (2013.01)

(58) Field of Classification Search
CPC . H01M 8/1004; H01M 4/8663; H01M 8/1253
See application file for complete search history.

(56) References Cited

U.S. PATENT DOCUMENTS

| | | | | |
|---|---|---|---|---|
| 2012/0321983 A1* | 12/2012 | Goettler | ................. | H01M 2/20 429/468 |
| 2013/0236811 A1* | 9/2013 | Miura | ................. | H01M 8/1004 429/482 |
| 2016/0351913 A1* | 12/2016 | Qiu | ..................... | H01M 8/1213 |

* cited by examiner

Primary Examiner — Cynthia H Kelly
Assistant Examiner — Monique M Wills
(74) Attorney, Agent, or Firm — Ming Chow; Sinorica, LLC

(57) ABSTRACT

A membrane electrode assembly structure of a fuel cell and a method of making the same are disclosed. The materials to be used include NiO, 8YSZ and 3YSZ that mixed into a slurry, formed into anodes by tape casting, sintered to form an anode substrate, and followed by forming a thin film of electrolyte layer on the surface of the anode substrate, forming a cathode layer on the outer surface of the electrolyte layer to obtain the membrane electrode assembly, which utilizes the 3YSZ having a tetragonal crystal phase to improve the toughness and mechanical strength of the material of NiO-8YSZ through calcination, thus the thickness of the anode substrate can be reduced, and the fuel gas diffusion path and resistance can be appropriately reduced to enhance the conductivity of the anode substrate.

4 Claims, 5 Drawing Sheets

MEMBRANE ELECTRODE ASSEMBLY STRUCTURE OF FUEL CELL AND THE METHOD OF FABRICATING THE SAME

BACKGROUND OF THE INVENTION

1. Field of the Invention

The present invention relates to a membrane electrode assembly structure for a fuel cell and a method for fabricating the same, more particularly, relates to improving the toughness and mechanical strength of an anode substrate to reduce the thickness of the substrate, thereby solving the problem of cracking during packaging and testing, increasing the output power density of the fuel cell to provide a stable electric power output in a longer duration.

2. Description of Related Art

A solid oxide fuel cell membrane electrode assembly (SOFC-MEA) is an energy conversion device that converts fuel to electric energy by electrochemical reaction. The traditional solid oxide fuel cell with the electrolyte supported cell (ESC) operates in a temperature range between 800 and 1000° C., and the thickness of the electrolyte layer is about 150-300 μm. Because the thickness of the electrolyte is thick and the overall bulk impedance is large that explains the ESC SOFC needs to operate in a higher temperature.

The thickness of YSZ electrolyte layer with NiO-YSZ anode supported cell (ASC) is below 10 μm, so the operating temperature can be reduced to in a range between 650 and 800° C. Before the cell is to be electrically tested in stack, the cell is packaged and it is subjected to pressure during the electrical measurement. Therefore, the mechanical strength of the cell becomes one of the important factors to be considered in the process.

The fabrication process of the traditional anode-supported SOFC-MEA is based on the tape casting technology to produce the anode green tape, and then the thickness and geometrical structure of the green substrate is adjusted by the laminating technique, followed by using a thin film ceramic process and a high temperature densification sintering process to produce a half-cell substrate including an anode supported layer and an electrolyte layer, and finally a cathode layer is built on the half-cell substrate by a screen printing technique to complete the production.

However, the main drawbacks of the conventional process described above are the poor stability and durability during reduction-oxidation cycling and thermal cycling test. In considering the basic requirements of the cathode and anode porosity in order to facilitate gas-solid reaction mechanism under the basic conditions, it is unavoidable to sacrifice mechanical strength, resulting in the subsequent cell stack packaging prone to failure situations, the mentioned above shortcomings also hinder the application and development of the SOFC.

In view of the foregoing drawbacks of the conventional fuel cell membrane electrode assembly, the inventors of the present invention have studied the drawbacks and sought for solutions.

SUMMARY OF THE INVENTION

The main object of the present invention is to provide a membrane electrode assembly structure of a fuel cell using NiO, 8YSZ, 3YSZ as the main material of the anode substrate. The 3YSZ is a material of tetragonal crystal phase exploited after calcinations to enhance the toughness and mechanical strength of material NiO-8YSZ to lessen the thickness of the anode substrate, which can moderately reduce the fuel gas diffusion path and resistance, and thus effectively improve the conductivity at the anode side of the fuel cell and improve the performance of SOFC.

Another object of the present invention is to provide a method for producing a membrane electrode assembly for a fuel cell by forming a slurry composed of NiO-8YSZ-3YSZ into an anode green tape by tape casting, followed by sintering the anode substrate, forming a film-like electrolyte layer on the surface, and when the gas permeability of the anode substrate and the electrolyte layer measured are in compliance with the specification required, then a cathode layer is formed on the outer surface of the electrolyte layer with a porous LSM (lanthanum strontium manganite) material, and a membrane electrode assembly (MEA) is completed. The overall process of the fabrication is reasonable and simplified, thus the membrane electrode assembly with high strength anode substrate can be produced at low cost and high efficiency.

In order to achieve the object and effect mentioned above, the feature of the present invention comprises: a membrane electrode assembly structure of an anode of a fuel cell comprising at least an anode substrate of sheet structure composed of NiO, 8YSZ, 3YSZ and other materials, in which the NiO is of 35 to 65 wt. % and the rest is the mixture of 8YSZ and 3YSZ, an electrolyte layer formed on the surface of the anode substrate, a cathode layer made is composed of a porous LSM material, and the layer is built on a front side of the electrolyte layer farther away from the anode substrate.

According to the membrane electrode assembly structure of the present invention, the 3YSZ has a composition of 10 to 90 wt. % in the composition of the mixture of 8YSZ and 3YSZ.

According to the mentioned above structure, the anode substrate is preferably composed of 65 wt % NiO+22.75 wt % 8YSZ+12.25 wt % 3YSZ, or 35 wt % NiO+42.25 wt % 8YSZ+22.75 wt % 3YSZ. The weight ratio of 8YSZ may be determined between 22 wt % and 23 wt %, and the 3YSZ weight ratio may be determined between 12 wt % and 13 wt % when NiO is of 65 wt %. The weight ratio of 8YSZ may be adjusted in a range from 42 wt % to 43 wt %, and the 3YSZ weight ratio may be adjusted in a range from 22 wt % to 23 wt % when NiO is of 35 wt %. Therefore, the ratio of wt % of 3YSZ to wt % of 8YSZ can be determined in a range from 50% to 60% when NiO is in a range from 35 wt % to 65 wt %.

According to the mentioned above structure, the anode substrate further contains a pore-forming agent of 3 wt. % or less.

According to the mentioned above structure, the thickness of the anode substrate is in the range from 200 to 600 μm.

The method of fabricating the membrane electrode assembly structure of the present invention comprises the following steps: preparing an anode green tape through mixing the NiO-8YSZ-3YSZ material into an anode slurry, forming the anode slurry into a thin strip anode green tape by tape casting, subjecting the thin strip anode green tape to a hot lamination and water pressure equalization process to fabricate an anode green substrate of predetermined thickness by laminating a plurality of the anode green tapes to build the anode green substrate, sintering the anode green substrate to form an anode substrate, applying a thin film-like electrolyte on the flat surface of the anode substrate, and sintering to form an electrolyte layer, measuring the gas permeability of the anode substrate and the electrolyte layer using a gas permeability meter, and checking the microstructure of the anode substrate and the electrolyte layer through Scanning Electron Microscope (SEM) microstructural analysis to examine that if the microstructural analysis shows the gas permeability is below $1.0 \times 10^{-5}$ Darcy and the microstructure has reached a pore-free state, then the result is confirmed affirmative "Y", and if the result is "N", the process subjects to repeat the preceding step of sintering process, forming a cathode layer on the outer surface of the electrolyte layer to form a cathode layer by a calcination process, and building a porous LSM material on the outer surface of the electrolyte layer by screen printing, and a calcination process is carried out to form a cathode layer on the outer surface of the electrolyte layer to complete the fabrication of the membrane electrode assembly structure of a fuel cell.

According to the method of fabricating the membrane electrode assembly structure of the present invention, the number of the laminated layers of the green substrate of the anode substrate is 2 to 6 layers.

According to the method of fabricating the membrane electrode assembly structure of the present invention, the sintering procedure of the green substrate of the anode substrate is sintered at a temperature of about 1250° C. for about 4 hours, and the rise/decrease rate of sintering temperature is about 1~3° C./min.

According to the method of fabricating the membrane electrode assembly structure of the present invention, the calcination process of the electrolyte is performed at about 1400° C. for about 6 hours, and the calcination temperature increase/decrease rate is about 1~3° C./min.

According to the method of fabricating the membrane electrode assembly structure of the present invention, the calcination procedure of the porous LSM material is carried out at about 1200° C. for about 3 hours, and the calcination temperature increase/decrease rate is about 1~3° C./min.

Other objects, advantages and novel features of the invention will become more apparent from the following detailed description when taken in conjunction with the accompanying drawings.

DETAILED DESCRIPTION OF THE PREFERRED EMBODIMENTS

Figure 1:
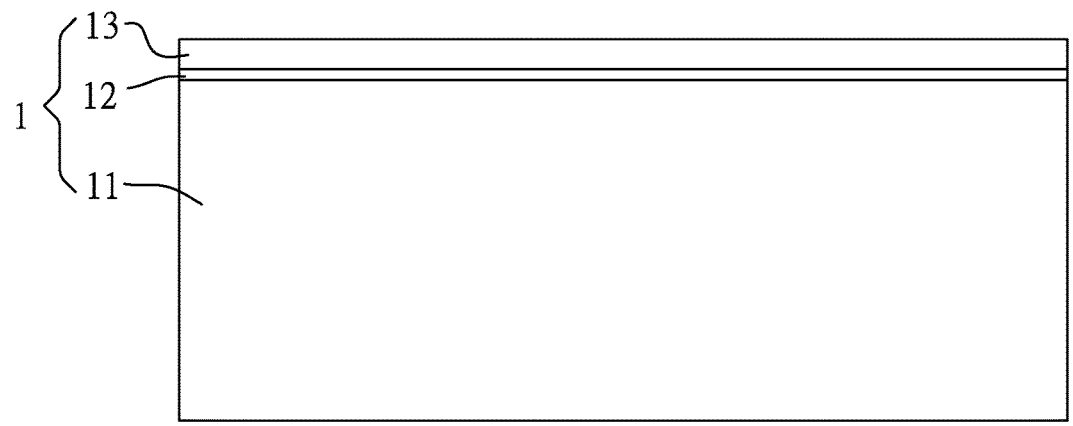
FIG. 1 is a plan view of the membrane electrode assembly of the present invention.

Referring to FIG. 1, the structure of the membrane electrode assembly 1 (MEA) of the present invention includes an anode substrate 11, an electrolyte layer 12, and a cathode layer 13. The anode substrate 11 is made essentially of NiO, 8YSZ, 3YSZ, wherein the composition of the anode substrate includes NiO 35 to 65 wt. % and the mixture of 8YSZ and 3YSZ in the balance, and the 3YSZ has 10 to 90 wt. % in the mixture of 8YSZ and 3YSZ.

Among the materials above mentioned, 8YSZ has the highest ionic conductivity, and the ionic conductivity of $ZrO_2$ increases with the addition of $Y_2O_3$, reaching its maximum value at 8% and decreasing after more than 8%.

At a $Y_2O_3$ dopant level of about 3%, it is referred to as tetragonal polycrystalline zirconia where the grain size is the smallest and has the highest mechanical toughness at room temperature, because with this condition almost 100% of the crystalline phase is tetragonal. However, at a temperature in the range of 200-500° C., the strength will be significantly reduced, because the crystal phase changes lead to the grain size changes, and with the increasing amount of $Y_2O_3$, the theoretical density decreased with the increase of the grain size.

According to the phase diagram, with the increase of the amount of $Y_2O_3$, the crystal phase is transformed from monoclinic to tetragonal, and when the addition amount of $Y_2O_3$ is 8-10%, it becomes cubic.

In a preferred embodiment, the anode substrate 11 is preferably composed of 65 wt. % NiO+22.75 wt. % 8YSZ+12.25 wt. % 3YSZ, and may be added in the process 3 wt. % or less of the pore-forming agent.

In the present embodiment, the thickness of the anode substrate 11 is 200 to 600 μm. The electrolyte layer 12 is formed on one surface of the anode substrate 11. The cathode layer 13 is formed of a porous LSM material, and the cathode layer 13 is formed on a front side of the electrolyte layer 12 farther away from the anode substrate 11.

Figure 2:
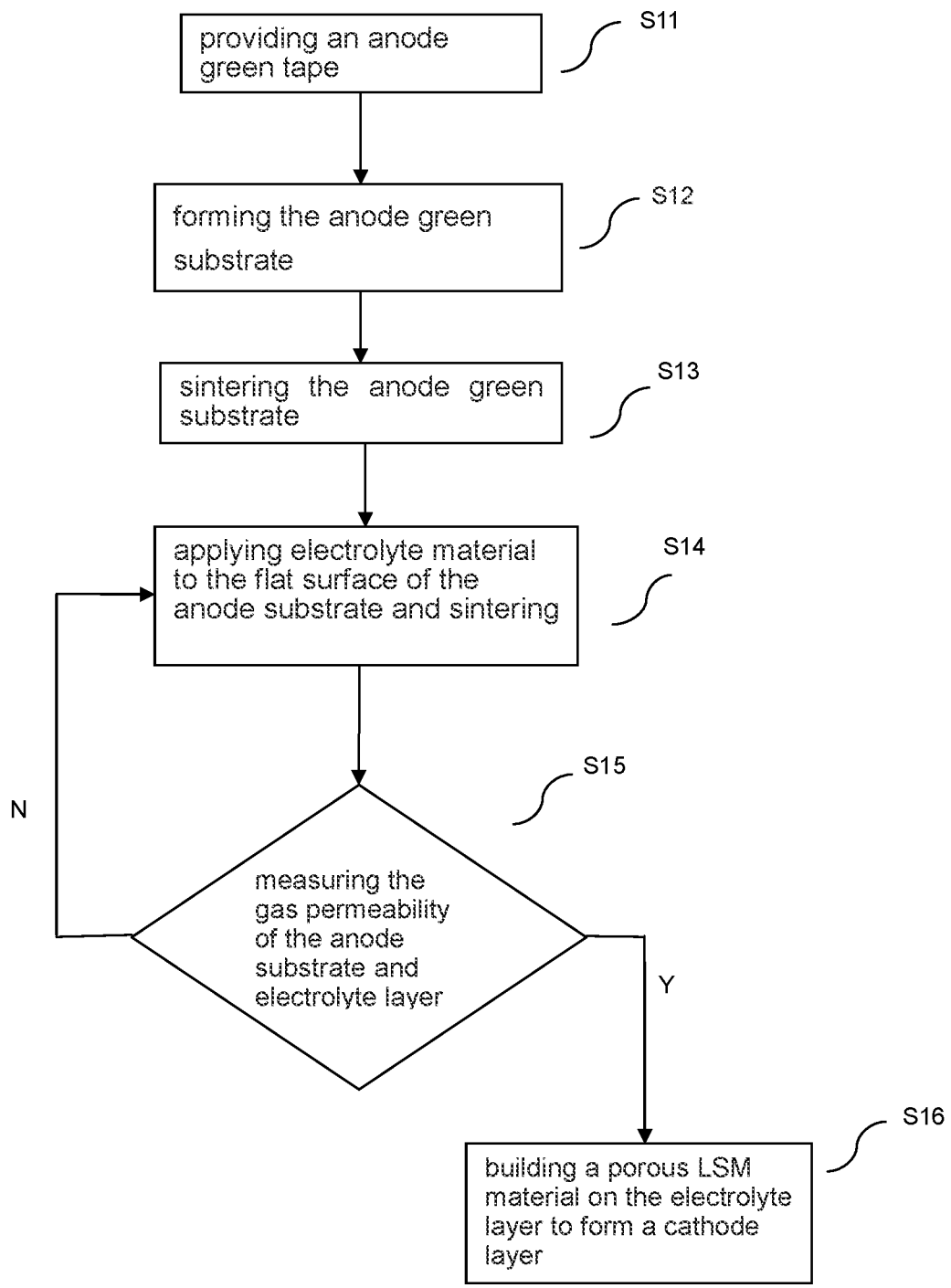
FIG. 2 is a flow chart showing the method of fabricating the membrane electrode assembly of the present invention.

Referring to FIG. 2, it is shown that the fabricating process of the membrane electrode assembly 1 of the present invention comprises the steps: S11 of "preparing an anode green tape," S12 "processing the anode green tape to form an anode green substrate with a predetermined thickness," S13 "sintering the anode green substrate and forming an anode substrate," S14 "coating an electrolyte material on the surface of the anode substrate and sintering to form an electrolyte layer," S15 "measuring whether the gas permeability of the anode substrate and the electrolyte layer is in compliance with specification," and S16 "forming a porous LSM material on the outer surface of the electrolyte layer and forming a cathode layer by a calcination process".

The following description refers to the structure of FIG. 2 as follows:

The S11 is a step to provide an anode green tape by adding a pore-forming agent in an amount of about 3 wt. % or less to the NiO-8YSZ-3YSZ mixture of an anode slurry, and the mixture is formed into a thin strip anode green tape by tape casting at a thickness of about 80 to 120 μm.

The S12 is a step of subjecting a plurality of 2 to 6 layers of the thin strip anode green tape to a hot lamination and water pressure equalization process to form the anode green substrate with preferable thickness between 200 μm and 600 μm.

The S13 is a step of sintering the anode green substrate for about 4 hours at a temperature of about 1250° C. and a sintering temperature increase/decrease rate of about 1~3° C./min to produce an anode substrate.

The S14 is a step applying a thickness of less than 10 μm electrolyte material to the flat surface of the anode substrate by the spin coating and sintering at a temperature of 1200° C. to 1600° C., preferably at 1400° C., at a sintering temperature rise/decrease rate of about 1~3° C./min for at least about 6 hours to form an electrolyte layer 12 on the surface on the anode substrate 11.

The S15 is a step of measuring the gas permeability of the anode substrate and the electrolyte layer, examining if the permeability measurement is in compliance with the specification. In which, the gas permeability of the anode substrate 11 and the electrolyte layer 12 is measured by a gas permeability meter to determine that if the permeability measurement is in compliance with $1.0 \times 10^{-5}$ Darcy or less, and the microstructure observation was performed using a scanning electron microscope to confirm that the surface of the anode substrate 11 and the surface of the electrolyte layer 12 were well bonded.

When the observation result is negative and denoted as "N", the structure had open pores and the gas permeability did not meet the specifications, the preceding step is carried out to repair defect at a temperature of 1200-1400° C. for about 6 hours, preferably until a fully dense of the microstructure is attained, and if the observation result is affirmative "Y", it indicates that the microstructure has no open pores, and the microstructural state can be regarded as fully dense and gas-isolating.

The S16 is a step of building a porous LSM material on the outer surface of the electrolyte layer 12 by screen printing, followed by performing calcination at a temperature of about 1200° C. with a sintering temperature increase/decrease rate of about 1~3° C. min to form a cathode layer 13 and complete the fabrication process of a membrane electrode assembly (MEA).

Figure 3:
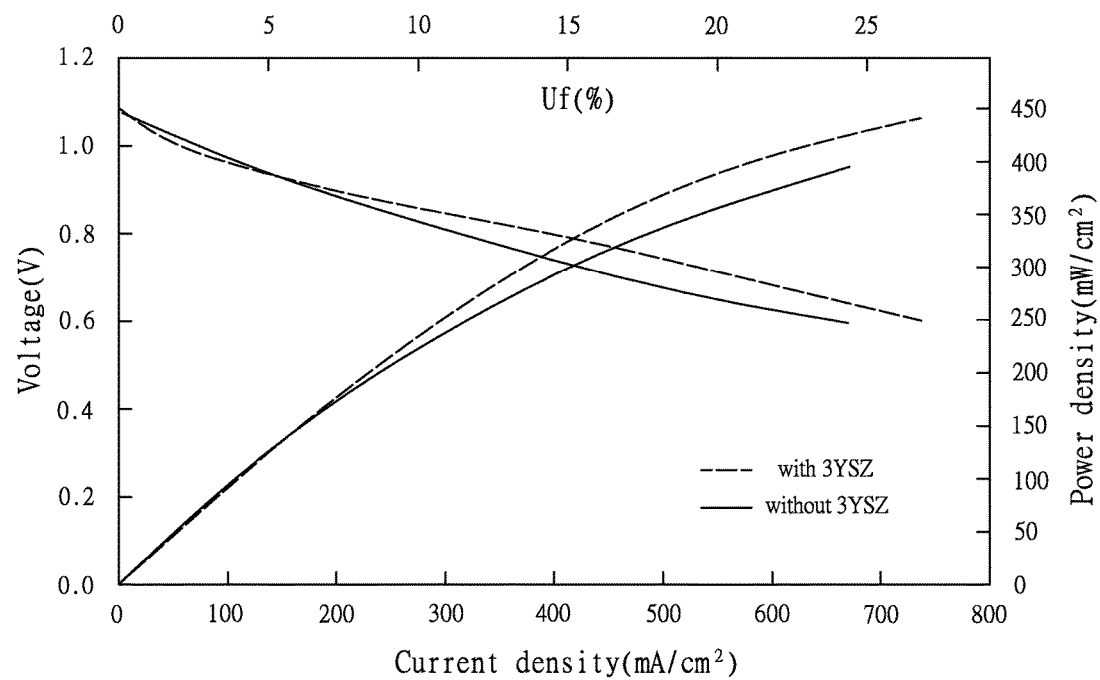
FIG. 3 is a graph showing the electrical performance of the fuel cell of the anode substrate of the present invention before and after the addition of 3YSZ.
Figure 4:
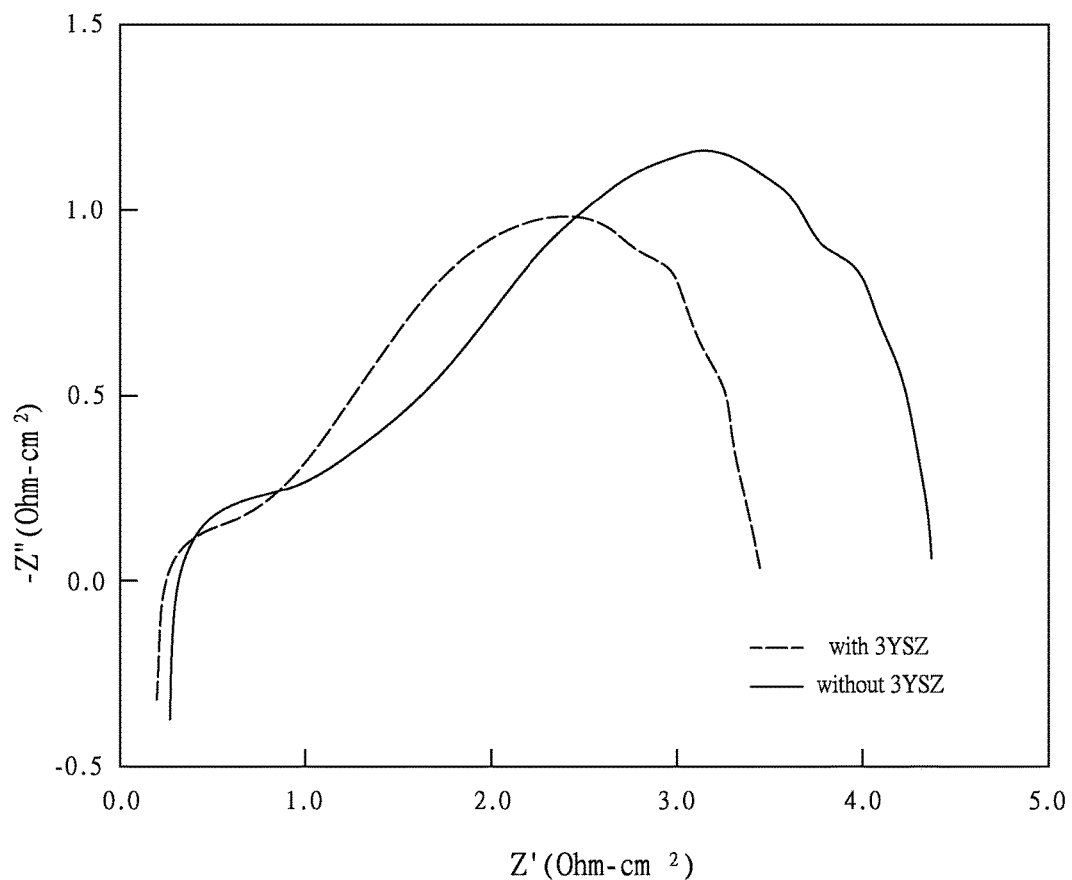
FIG. 4 is a diagram of the fuel cell impedance analysis of the anode substrate of the present invention before and after the addition of 3YSZ.

Referring to FIGS. 3 and 4, it can be seen that in the structure of the above described membrane electrode assembly 1 of the present invention, since the 3YSZ has a lower ionic conductivity than 8YSZ, partial doping of 3YSZ can effectively enhance the strength of the anode substrate 11, and the total cell thickness of the unit cell fabricated in a preferred embodiment of the present invention can be reduced from 550 μm to 450 μm, thus reducing the gas diffusion resistance of the anode and thus the total impedance of the unit cell; The results of comparison of the electrical performance test show that the cell's open circuit voltage is close to the theoretical standard value (>1.1V), and power efficiency significantly increased by 15%.

Figure 5:
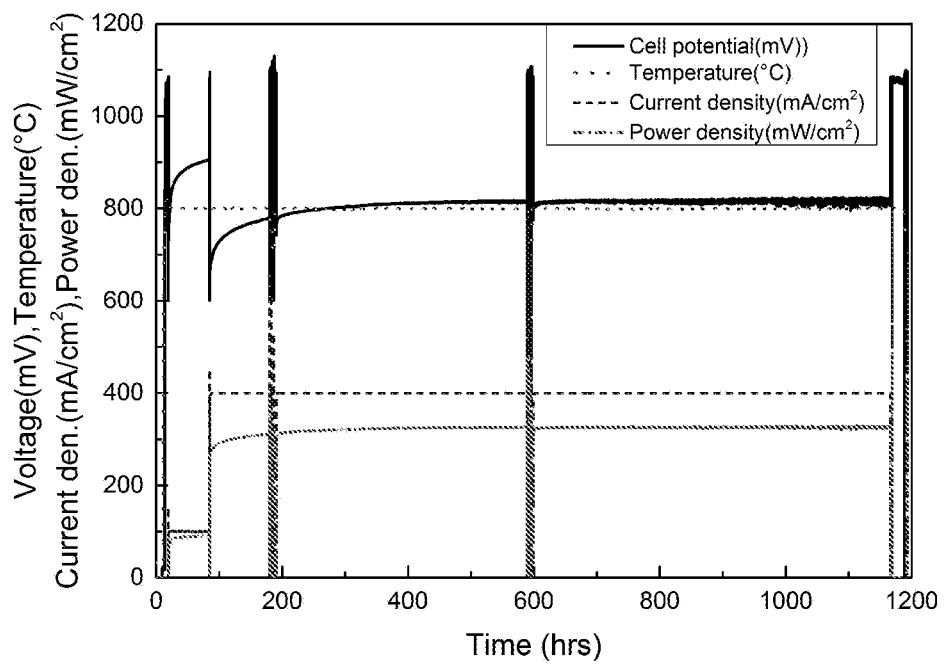
FIG. 5 is a graph of the cell's electrical performance for a long period of time according to the present invention.

As shown in FIG. 5, the long-term test results of the battery electrical performance, operating at a constant current of 400 mAcm$^{-2}$, it showed continued increase in the cell voltage rise slope, indicating that reducing the thickness of the anode substrate 11 shortened the gas diffusion path that leads to the gas concentration increasing at theriple phase boundary (TPB) at the interface between the anode substrate 11 and the electrolyte layer 12, improving the electrochemical reaction efficiency, and the decay rate is 1% or less after the 1,000-hour operation test, thereby enhancing the durability and stability of the cell operation.

In view of the above description, the membrane electrode assembly structure of the fuel cell and the fabrication method of the present invention can be used to improve the toughness and the mechanical strength of the anode substrate to enable reducing the thickness of the substrate and enhancing the anode side conductivity and the cell performance.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method of fabricating a membrane electrode assembly structure of a fuel cell, comprising steps:
   providing an anode green tape by adding a pore-forming agent in an amount of 3 wt. % or less to a NiO-8YSZ-3YSZ mixture of an anode slurry, and the mixture is formed into a thin strip anode green tape by tape casting at a thickness of 80 μm to 120 μm;
   subjecting a plurality of the thin strip anode green tape to a hot lamination and water pressure equalization process to form an anode green substrate with thickness between 200 μm and 600 μm;
   sintering the anode green substrate for 4 hours in at a temperature of 1250° C. and a sintering temperature with a rate of 1~3° C. min to produce the anode substrate;
   applying a thickness of less than 10 μm electrolyte material to the flat surface of the anode substrate by a spin coating and sintering at a temperature in a range of 1200° C. to 1600° C., at a sintering temperature with a rate of 1~3° C./min for at least 6 hours to form an electrolyte layer on the surface of the anode substrate;
   measuring the gas permeability of the anode substrate and the electrolyte layer, if the permeability measurement is of $1.0 \times 10^{-5}$ Darcy or less, and checking if the surface of the anode substrate and the surface of the electrolyte layer were well bonded, if the result is negative, the preceding step is carried out to repair defect at a temperature of 1200° C.-1400° C. for 6 hours, until the result is affirmative that indicates the microstructure has no open pores left,
   building a porous LSM (lanthanum strontium manganite) material on the outer surface of the electrolyte layer by screen printing, followed by performing calcination at a temperature of 1200° C. with a rate of 1~3° C./min, forming the porous LSM material on the outer surface of the electrolyte layer a cathode layer and the membrane electrode assembly structure is completed.

2. The method of fabricating a membrane electrode assembly for a fuel cell according to claim 1, wherein the number of the laminated layers of the anode green substrate is 2 to 6 layers.

3. The method of fabricating a membrane electrode assembly for a fuel cell according to claim 1, wherein the calcination step of the electrolyte is performed at 1400° C. for 6 hours with a rate of 1~3° C./ min.

4. The method of fabricating a membrane electrode assembly for a fuel cell according to claim 1, wherein the sintering of the porous LSM material is performed at 1200° C. for 3 hours with a rate of 1~3° C./min.

* * * * *